Patented Jan. 16, 1923.

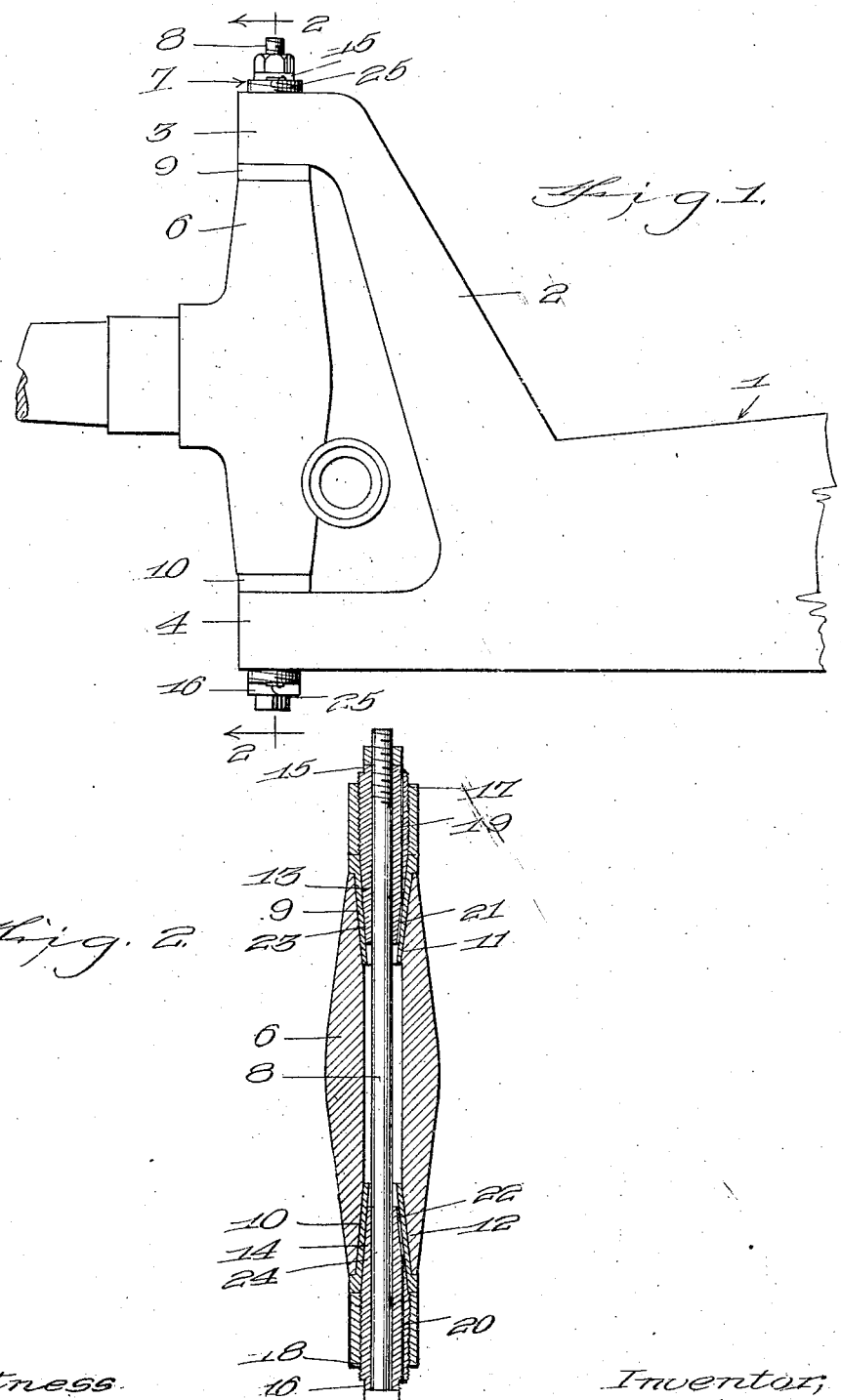

1,442,139

UNITED STATES PATENT OFFICE.

MAX H. FEIST, OF TOUTLE, WASHINGTON.

SPINDLE-ADJUSTER MODEL.

Application filed June 2, 1921. Serial No. 474,481.

*To all whom it may concern:*

Be it known that I, MAX H. FEIST, a citizen of the United States, residing at Toutle, in the county of Cowlitz and State of Washington, have invented certain new and useful Improvements in Spindle-Adjuster Models, of which the following is a specification.

This invention relates to improvements in vehicles and has for its object to provide means for taking up wear in axle spindles.

Another object of the invention is to provide tapered plugs for supporting axle spindles in an axle fork.

A still further object of the invention is to provide axle spindles having tapered bushings in its ends, tapered plugs seating in said bushings and means whereby said plugs may be forced into said bushings from time to time as the same wear away.

With the above and other objects in view, I have invented a device illustrated in the accompanying drawings in which—

Figure 1 is an elevational view of an axle end and,

Figure 2 is a section on line 2—2 thereof.

Like reference characters indicate like parts throughout the following specification and in the several views in the drawings in which 1 indicates an axle having an end fork 2 between the ends 3 and 4 of which is mounted a spindle 6 by means of my adjustable spindle support 7 which consists of a bolt 8 having a pair of tapered bushings 9 and 10 which seat in similarly formed recesses 11 and 12 in the ends of the spindle 6. Seating in said bushings are tapered plugs 13 and 14 through which the bolt 8 projects. As the bushings wear away, the plugs 13 and 14 may be screwed further into said bushings, said plugs being threaded into said ends 3 and 4 and having their rectangular ends 15 and 16 projecting through the openings 17 and 18 of said ends, whereby the plugs may be engaged by a suitable wrench. This arrangement permits gradual take-up of any space caused by wear upon the bushings. The bushings 9 and 10 are driven tight into the ends of the spindle body 6.

Each of the plugs 13 and 14 are provided with bores 19 and 20 terminating in grooves 21 and 22 throughout the length of tapered portions 23 and 24 of the plugs, whereby lubricants may be supplied to said plug within said bushings. Pivoted closures 25 may be provided for said bores 19 and 20.

Having described my invention, that which I claim is new and desire to procure by Letters Patent is:

1. In a device of the character described, an axle having spaced apart prongs each provided with vertically aligning apertures, a spindle having a vertical bore therethrough adapted to align with said apertures, said bore having tapered ends, tapered bushings mounted in said ends and plugs tapered at their inner ends and projecting through said apertures and into said bushings.

2. In a device of the character described, an axle having spaced apart prongs each provided with vertically aligning apertures, a spindle having a vertical bore therethrough adapted to align with said apertures, said bore having tapered ends, tapered bushings mounted in said ends and plugs tapered at their inner ends and projecting through said apertures and into said bushings, and means whereby said plugs may be adjusted relative to said bushings.

3. In a device of the character described, an axle having spaced apart prongs each provided with vertically aligning apertures, a spindle having a vertical bore therethrough adapted to align with said apertures, said bore having tapered ends, tapered bushings mounted in said ends and plugs tapered at their inner ends and projecting through said apertures and into said bushings, and means whereby said plugs may be adjusted relative to said bushings, said means consisting of the threaded connection between the outer ends of said plugs and said apertured prongs.

4. In a device of the character described, an axle having spaced apart prongs each provided with vertically aligning apertures, a spindle having a vertical bore therethrough adapted to align with said apertures, said bore having tapered ends, tapered bushings mounted in said ends and plugs tapered at their inner ends and projecting through said apertures and into said bushings, and means whereby said plugs may be adjusted relative to said bushings, said means consisting of the threaded connection between the outer ends of said plugs and said apertured prongs, said plugs having bores extending therethrough, aligning with the bore of said spindle, a bolt projecting through said bores and a nut threaded on said bolt, said bolt and nut being adapted to hold said plugs against accidental rotation.

In testimony whereof I affix my signature in the presence of two witnesses.

MAX H. FEIST.

Witnesses:
 FRED R. ANDERSON,
 JOHN EPPERSON.